(12) United States Patent
Nakata et al.

(10) Patent No.: US 10,080,969 B2
(45) Date of Patent: Sep. 25, 2018

(54) MATCHING SYSTEM, INFORMATION PROCESSING APPARATUS, SERVER, MATCHING METHOD, AND STORAGE MEDIUM STORING MATCHING PROGRAM

(75) Inventors: Tetsuya Nakata, Kyoto (JP); Atsushi Asakura, Kyoto (JP); Yusuke Shiraiwa, Kyoto (JP); Takumi Masuda, Kyoto (JP); Keigo Nakano, Kyoto (JP); Kosuke Yabuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 573 days.

(21) Appl. No.: 13/551,138

(22) Filed: Jul. 17, 2012

(65) Prior Publication Data

US 2013/0102392 A1 Apr. 25, 2013

(30) Foreign Application Priority Data

Oct. 20, 2011 (JP) .................................. 2011-230777

(51) Int. Cl.
*A63F 13/00* (2014.01)
*A63F 13/795* (2014.01)
*A63F 13/35* (2014.01)

(52) U.S. Cl.
CPC ............ *A63F 13/795* (2014.09); *A63F 13/35* (2014.09); *A63F 2300/5566* (2013.01)

(58) Field of Classification Search
CPC ............ A63F 2300/40; A63F 2300/401; A63F 2300/402; A63F 2300/403;

(Continued)

(56) References Cited

U.S. PATENT DOCUMENTS

2006/0121990 A1 6/2006 O'Kelley, II et al.
2006/0247055 A1 11/2006 O'Kelley, II et al.
(Continued)

FOREIGN PATENT DOCUMENTS

EP 1 570 887 9/2005
JP 2005-270649 10/2005
(Continued)

OTHER PUBLICATIONS

European Search Report (6 pages) dated Apr. 12, 2013, issued in EP Application No. 12176900.4.
(Continued)

*Primary Examiner* — Tramar Harper
*Assistant Examiner* — Jeffrey Wong
(74) *Attorney, Agent, or Firm* — Nixon & Vanderhye P.C.

(57) ABSTRACT

A game system 100, which is an example of a matching system, includes a game server 500 and a plurality of game devices 300 that are connected to the game server 500 over a network. The game system 100 includes a related player presenting section 331 for presenting, to a participating player who is attempting to join a game and for whom matchmaking is to be performed in any of matching rooms that are matching ranges, a related player related to the participating player, a matching room identification section 54 for identifying a matching room that is associated with the related player presented by the related player presenting section 331, and a matching processor 55 for performing matchmaking in the matching room identified by the matching room identification section 54.

20 Claims, 7 Drawing Sheets

(58) Field of Classification Search
CPC .......... A63F 2300/404; A63F 2300/405; A63F 2300/406; A63F 2300/407; A63F 2300/408; A63F 2300/409; A63F 2300/5566; A63F 13/795
USPC .......................................................... 463/42
See application file for complete search history.

(56) References Cited

U.S. PATENT DOCUMENTS

2006/0287096 A1\* 12/2006 O'Kelley, II ........... A63F 13/12
463/42
2012/0311686 A1\* 12/2012 Medina ............... H04L 63/0807
726/7

FOREIGN PATENT DOCUMENTS

| JP | 2006-158956 | 6/2006 |
| JP | 2007-20717 | 2/2007 |
| JP | 2008-538318 | 10/2008 |
| JP | 2008-546469 | 12/2008 |
| JP | 2009-247548 | 10/2009 |
| JP | 2010-284273 | 12/2010 |

OTHER PUBLICATIONS

Japanese Operations Manual for Mario Kart Wii, pp. 23-24, and Translation, 7 pages, Apr. 2008.

\* cited by examiner

[Fig. 1]
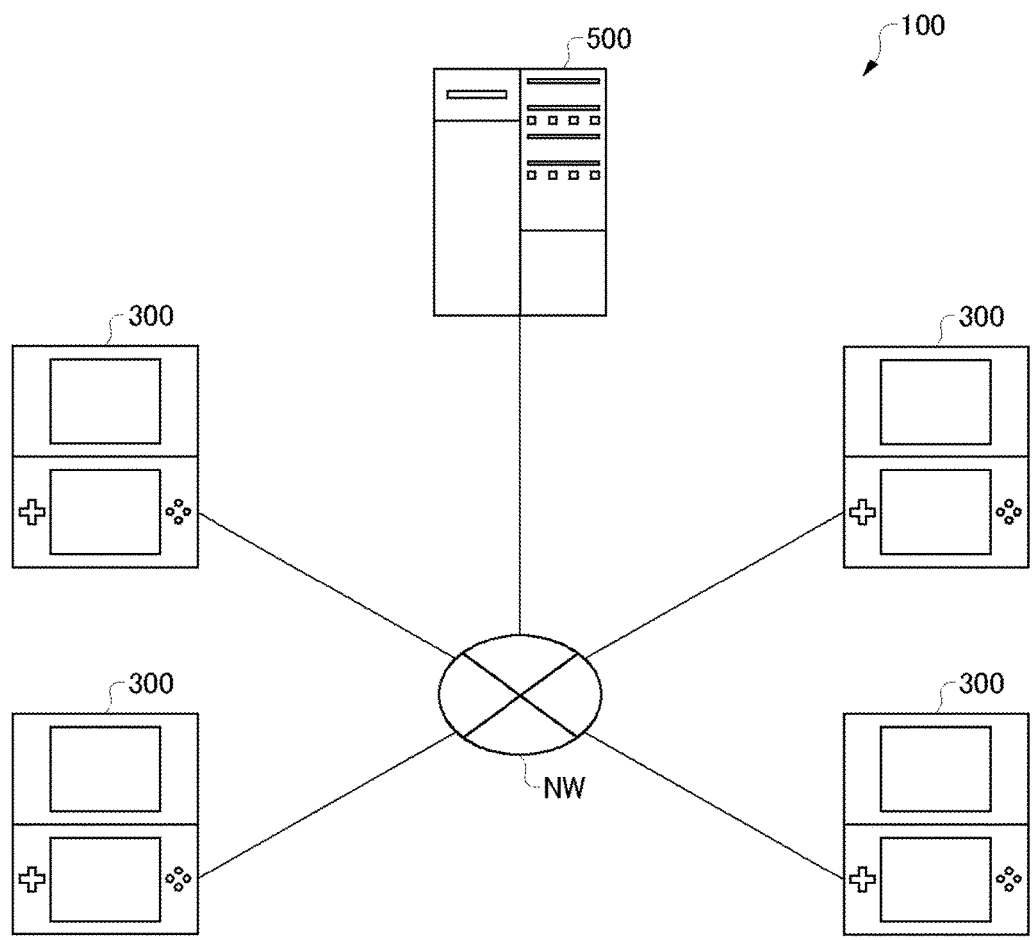

[Fig. 2]
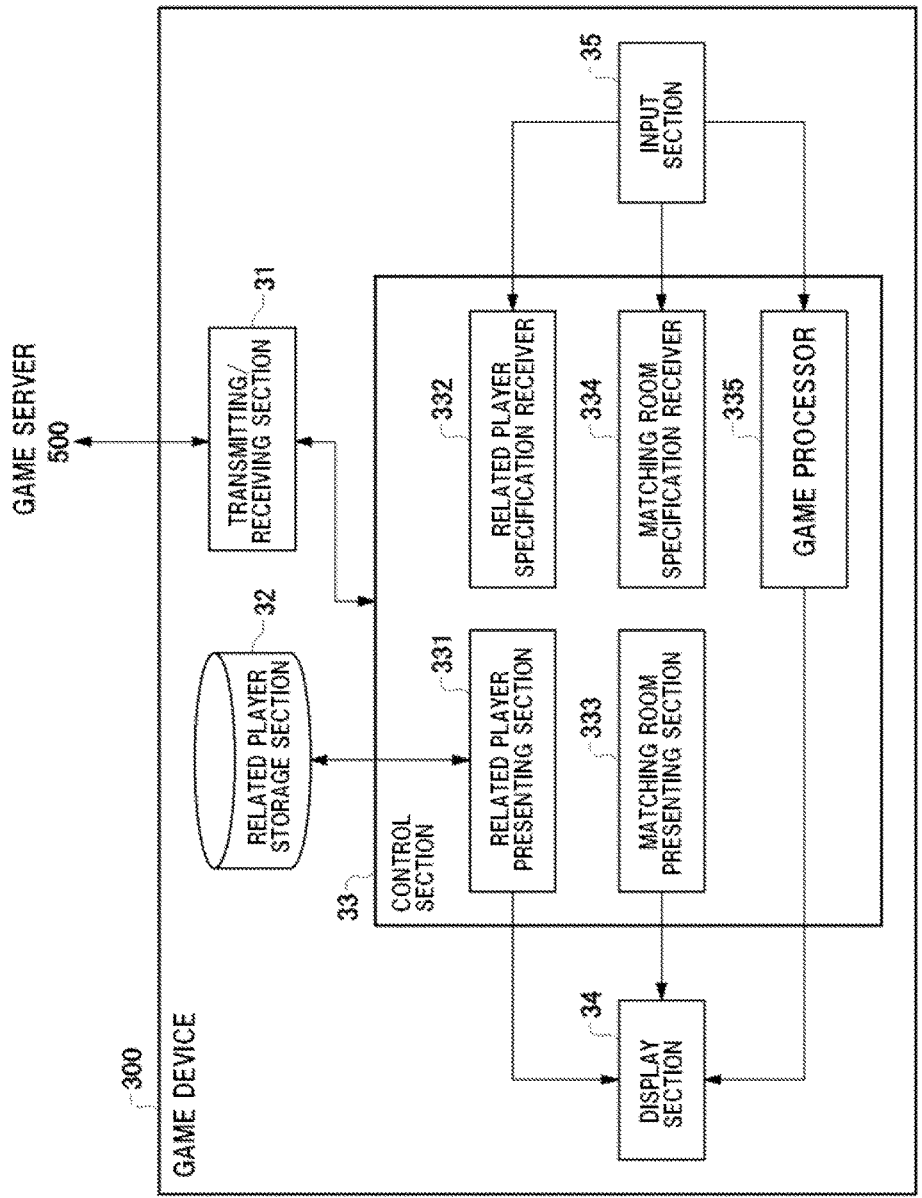

【Fig. 3】
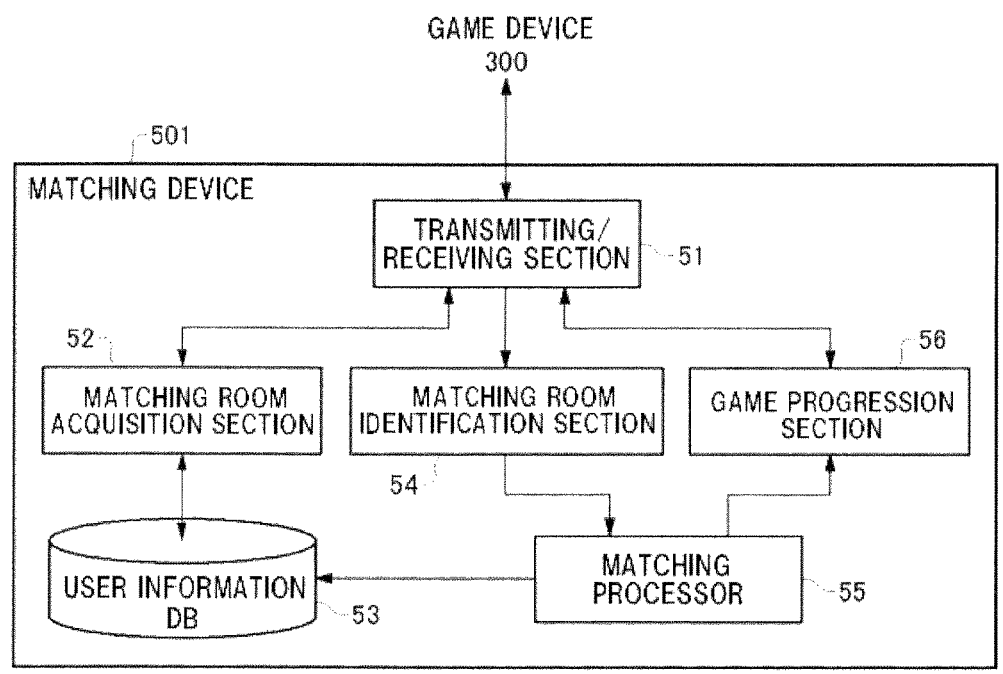

[Fig. 4]
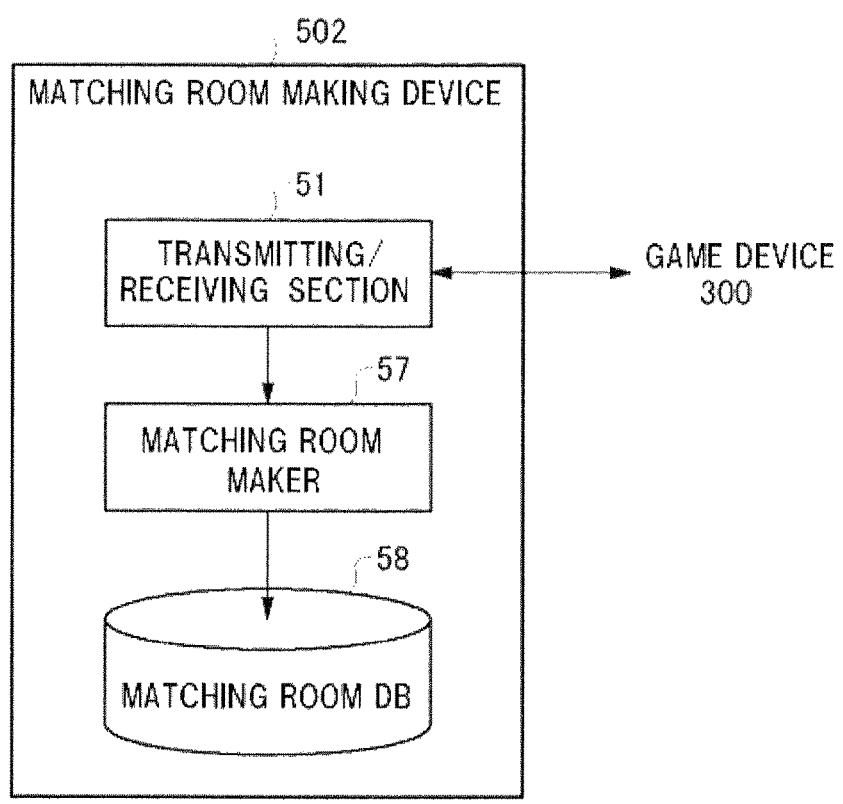

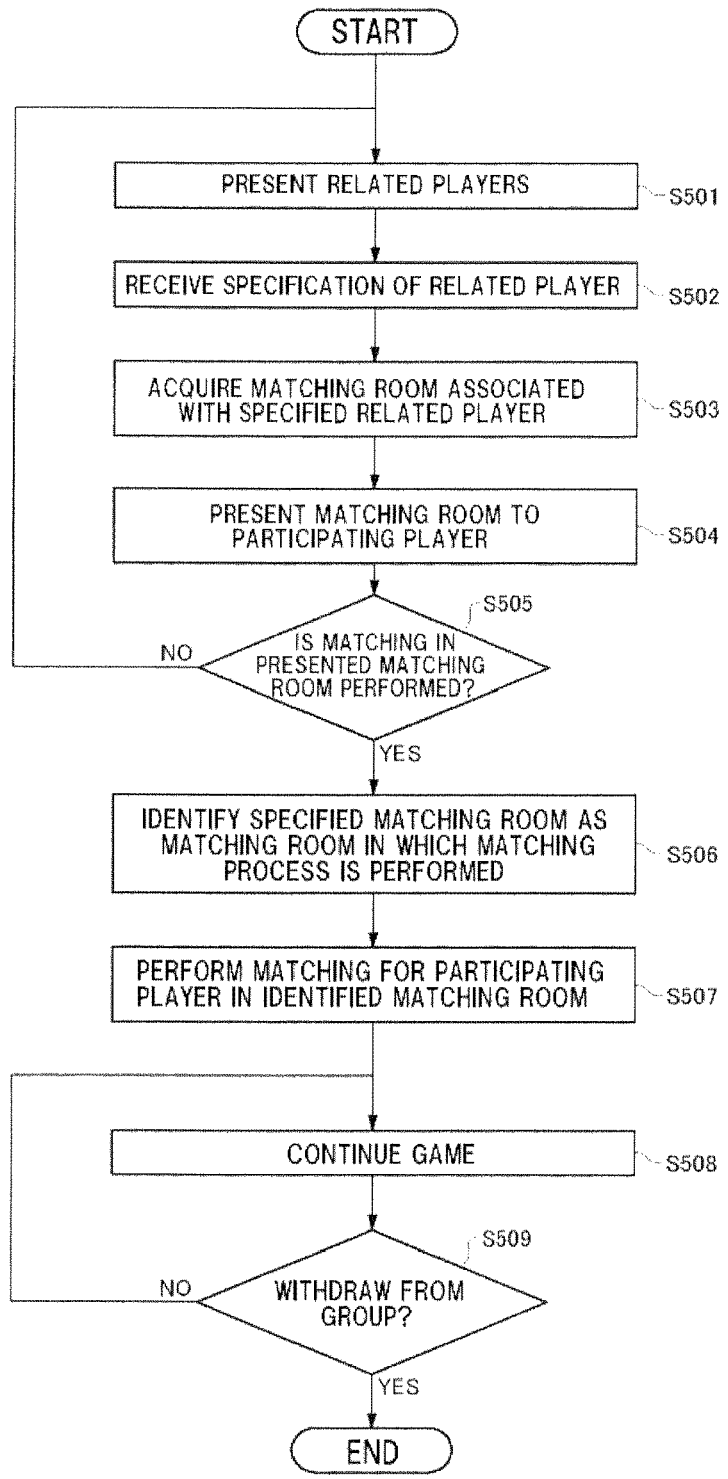
[Fig. 5]

【Fig. 6】
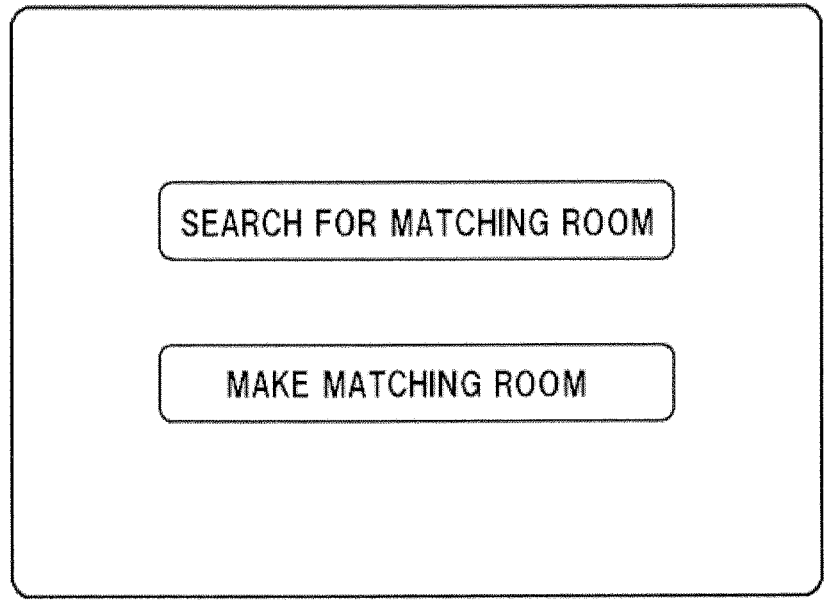
【Fig. 7】
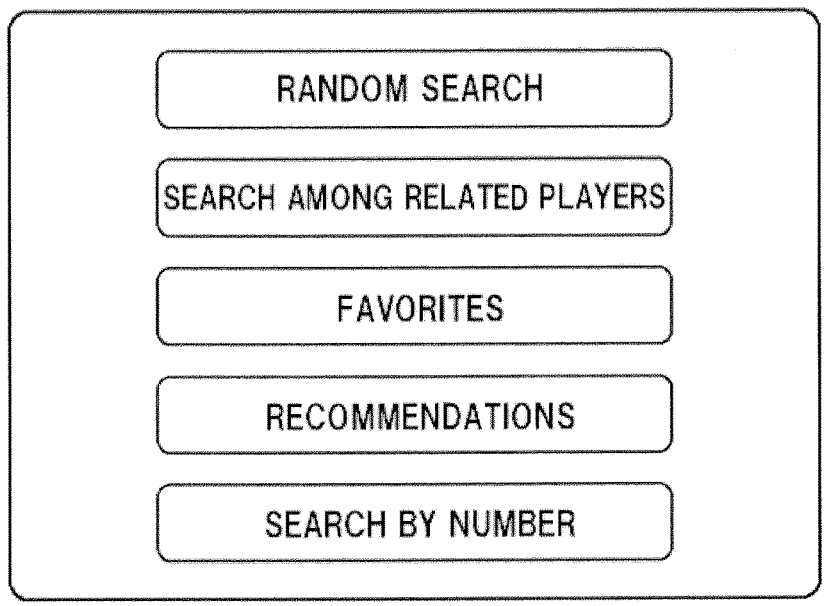

【Fig. 8】
【Fig. 9】

MATCHING SYSTEM, INFORMATION PROCESSING APPARATUS, SERVER, MATCHING METHOD, AND STORAGE MEDIUM STORING MATCHING PROGRAM

CROSS REFERENCE TO RELATED APPLICATION

The disclosure of Japanese Patent Application No. 2011-230777, filed on Oct. 20, 2011, is incorporated herein by reference.

FIELD

This specification discloses a matching system for performing matchmaking for a participating users who is attempting to perform predetermined information processing while a plurality of information processing apparatuses are communicating information over a network, and also discloses an information processing apparatus, a server, a matching method, and a storage medium having stored therein a matching program.

BACKGROUND AND SUMMARY

Conventionally, a game system is known in which a plurality of players form a group and the players in the group play a game together over a network. According to this game system, a game progresses on a game device of each player participating in the group, based not only on operation information of the user of the game device, but also on operation information of other players in the group.

A group is formed by performing matchmaking among players all over the world who are connected to a network, or by performing matchmaking among players in a country who are connected to a network.

If, as in the conventional technology described above, the range in which matchmaking is performed (hereinafter, referred to as a "matching range") is too wide, one will be matched only with a player who is a total stranger. Thus, even if a user wanted to play a game with a player satisfying a specific condition (for example, a person from the same school, a person having the same taste, a person living in the same district, and so on), matchmaking with a player satisfying such specific condition could not be realized.

In contrast to such a conventional game system, it is conceivable to provide a variety of matching ranges (for example, ranges for each school, each taste, each district, and so on) and to perform matchmaking, within each matching range, among players who want to be matched. This enables to realize matchmaking among players satisfying any of the various conditions.

However, if the number of matching ranges is too large, a player will have difficulty in finding a matching range that is to his/her liking. In addition, even if a user wants to play a game with a specific player, the user may not know the matching range the specific player is using.

Thus, a technology that aids selection of a matching range by a user from a large number of matching ranges is desired.

A matching system of an example embodiment is a matching system which includes a server and a plurality of information processing apparatuses connected to the server over a network and which performs matchmaking, in any of a plurality of matching ranges, for a participating user attempting to perform predetermined information processing while the information processing apparatuses are communicating information, the matching system being configured to include a related user presenting section for presenting to the participating user a related user related to the participating user, a matching range identification section for identifying a matching range that is associated with the related user presented by the related user presenting section, and a matching processor for performing matchmaking for the participating user in the matching range identified by the matching range identification section.

According to this configuration, matchmaking can be performed in a matching range that is associated with a related user related to a participating user, and the participating user can be aided in the selection of a matching range from a large number of matching ranges. "Identify a matching range" herein refers to determination of, among a plurality of matching ranges, one matching range in which matchmaking is performed by the matching processor.

In the matching system described above, the related user may include at least any of a user identified and registered by the participating user, a user with established near field communication with the participating user, a user who was matched with the participating user in the past, a user selected based on an attribute of the participating user, and a user matched in a matching range made by the participating user.

According to this configuration, a user suitable for the related user of a participating user can be presented, and matchmaking can be performed in the matching range that is associated with such related user.

The matching system described above may further include a matching range presenting section for presenting the matching range that is associated with the related user presented by the related user presenting section, and a matching range specification receiver for receiving specification of the matching range, and the matching range identification section may identify the matching range whose specification has been received by the matching range specification receiver as a matching range in which matchmaking is to be performed by the matching processor.

According to this configuration, with a participating user specifying a matching range when a matching range that is associated with a related user is presented to the participating user, matchmaking can be performed by identifying the specified matching range as a matching range in which matchmaking is to be performed. Additionally, one or more matching ranges may be associated with a related user, and the matching range presenting section may present the one or more matching ranges associated with the related user.

In the matching system described above, the matching range presenting section may present, as the matching range that is associated with the related user, at least any of a matching range in which the related user has most recently been matched, a matching range determined based on a history of matchmaking of the related user, a matching range in which the related user is currently being matched, and a matching range made by the related user.

According to this configuration, a matching range suitable for the matching range that is associated with a related user can be presented to a participating user. Additionally, a matching range determined based on the history of matchmaking of the related user may be a matching range in which the related user is most frequently matched in the history of matchmaking of the related user, for example.

The matching system described above may further include a related user specification receiver for receiving specification of the related user, and the matching range identification section may identify the matching range that is associated with the related user whose specification has been received by the related user specification receiver as a matching range in which matchmaking is to be performed by the matching processor.

According to this configuration, with a participating user specifying a related user when the related user is presented to the participating user, matchmaking can be performed by identifying a matching range that is associated with the related user as a matching range in which matchmaking is to be performed.

In the matching system described above, the matching range that is associated with the related user may be any of a matching range in which the related user has most recently been matched, a matching range determined based on a history of matchmaking of the related user, a matching range in which the related user is currently being matched, and a matching range made by the related user.

According to this configuration, when a related user is presented to a participating user and the related user is specified by the participating user, matchmaking can be performed by identifying a matching range suitable for the matching range that is associated with the specified related user as a matching range in which matchmaking is to be performed.

In the matching system described above, the related user presenting section may present the related user so as to show that the related user is online.

According to this configuration, a participating user can be informed of a related user who is online and with whom predetermined information processing may be performed together by matchmaking. Additionally, to show that a related user is online, an indicator indicating whether a related user is online or offline may be attached at the time of presenting all the related users, or only the related users who are online may be presented.

In the matching system described above, the matching processor may perform matchmaking between the participating user and the related user.

According to this configuration, even if a plurality of groups are formed in a matching range which has been identified, a participating user can be matched with a related user related to the participating user and perform predetermined information processing together with the related user.

The matching system described above may further include a matching range maker for making the matching range based on an operation at the information processing apparatus.

According to this configuration, predetermined information processing can be performed between users who like each other. However, if a user is allowed to make a matching range by himself/herself, the number of matching ranges may become extremely large due to many users making the matching ranges. In this case, according to the matching system described above, matchmaking can be performed in a matching range that is associated with a related user related to a participating user, and the participating user can be aided in the selection of a matching range from an extremely large number of matching ranges.

In the matching system described above, the matching processor may perform matchmaking in the matching range identified by the matching range identification section, without presenting a user who is matched within the identified matching range.

According to this configuration, a participating user does not know which user is in the matching range in which the participating user is to be matched. This prevents the participating user who is to be matched in a certain matching range from feeling attached to another user in the matching range or from feeling that he/she belongs to the matching range. Because, as described above, a user belonging to a group in a matching range and performing predetermined information processing neither feels attached to another user in the matching range nor feels that he/she belongs to the matching range, a participating user who is to be newly matched in the matching range will feel no psychological barrier to joining the matching range, and a psychological effect can be expected which facilitates selection of the matching range.

In the matching system described above, the server may be a game server, the information processing apparatus may be a game device, and the matching system may be a game system which includes the game server and a plurality of game devices connected to the game server over a network and which performs matchmaking, in any of a plurality of matching ranges, for a participating user attempting to play a game while the game devices are communicating information.

According to this configuration, a matching range suitable as the matching range that is associated with a related player can be presented to a participating player of a game.

In the matching system described above, the matching range may be a matching room explicitly indicating a specific condition regarding participating users who are to join the matching room.

According to this configuration, what kind of condition is set to a matching range in which matchmaking is to be performed can be presented to a participating user.

An information processing apparatus of an example embodiment is an information processing apparatus used in the matching system described above, and this information processing apparatus includes a related user memory storing therein information regarding the related user and the related user presenting section, and the related user presenting section presents a related user based on the information stored in the related user memory.

According to this configuration, a related user related to a user who is the owner of an information processing apparatus is stored therein and presented by the information processing apparatus. Additionally, the information processing apparatus may receive the status of the related user, information regarding a matching range that is associated with the related user and the like from the server and present the same.

A server of an example embodiment is a server used in the matching system described above, and this server includes a matching range acquisition section for acquiring a matching range that is associated with a related user and providing information regarding the acquired matching range to an information processing apparatus, the matching range identification section, and the matching processor, and the matching range identification section receives, from the information processing apparatus, specification of a matching range provided by the matching range acquisition section to the information processing apparatus, and identifies the matching range whose specification has been received as a matching range in which matchmaking is to be performed by the matching processor.

According to this configuration, the server receives specification of a related user, and performs a matching process in a matching range that is associated with the specified related user.

A server of another example embodiment is a server used in the matching system described above, and includes the matching range identification section and the matching processor, and the matching range identification section receives specification of the related user from the information processing apparatus, and identifies a matching range that is associated with the specified related user as a matching range in which matchmaking is to be performed by the matching processor.

According to this configuration, the server receives specification of a matching range, and performs a matching process in the specified matching range.

A matching method of an example embodiment is a matching method for performing matchmaking, in any of a plurality of matching ranges, for a participating user attempting to perform information communication with a plurality of information processing apparatuses, and this matching method includes a related user presenting step of presenting to the participating user a related user related to the participating user, a matching range identification step of identifying a matching range that is associated with the related user presented in the related user presenting step, and a matching processing step of performing matchmaking for the participating user in the matching range identified in the matching range identification step.

According to this method, matchmaking can be performed in a matching range that is associated with a related user related to a participating user, and the participating user can be aided in the selection of a matching range from a large number of matching ranges.

A storage medium of an example embodiment has stored therein a matching program causing a computer of an information processing apparatus for performing matchmaking, in any of a plurality of matching ranges, for a participating user attempting to perform information communication with a plurality of information processing apparatuses to function as: a related user specification receiver for receiving specification, from the participating user, of a related user related to the participating user, a matching range acquisition section for acquiring, and providing to the participating user, a matching range that is associated with the related user whose specification has been received by the related user specification receiver, a matching range identification section for receiving the specification of the matching range provided by the matching range acquisition section, and identifying the matching range whose specification has been received, and a matching processor for performing matchmaking for the participating user in the matching range identified by the matching range identification section.

According to this configuration, matchmaking can be performed in a matching range which has been specified by receiving specification of the matching range, and a participating user can be aided in the selection of a matching range from a large number of matching ranges.

A storage medium of an example embodiment has stored therein a matching program causing a computer of an information processing apparatus for performing matchmaking, in any of a plurality of matching ranges, for a participating user attempting to perform information communication with a plurality of information processing apparatuses to function as: a related user specification receiver for receiving specification, from the participating user, of a related user related to the participating user, a matching range identification section for identifying a matching range that is associated with the related user whose specification has been received by the related user specification receiver, and a matching processor for performing matchmaking for the participating user in the matching range identified by the matching range identification section.

According to this configuration, matchmaking can be performed in a matching range that is associated with a related user, related to a participating user, who has been specified by receiving specification of the related user, and the participating user can be aided in the selection of a matching range from a large number of matching ranges.

These and other objects, features, aspects and advantages will become more apparent from the following detailed description of non-limiting example embodiments when taken in conjunction with the accompanying drawings.

BRIEF DESCRIPTION OF THE DRAWINGS

FIG. 1 shows an example non-limiting diagram showing an overall configuration of a game system;

FIG. 2 shows an example non-limiting block diagram showing a configuration of a game device;

FIG. 3 shows an example non-limiting block diagram showing a configuration of a game server that functions as a matching device;

FIG. 4 shows an example non-limiting block diagram showing a configuration of a game server that functions as a matching room making device;

FIG. 5 shows an example non-limiting flowchart of a matching method;

FIG. 6 shows an example non-limiting diagram showing an example of a matching top screen;

FIG. 7 shows an example non-limiting diagram showing an example of a matching room search top screen;

FIG. 8 shows an example non-limiting diagram showing an example of a related player presenting screen; and FIG. 9 shows an example non-limiting diagram showing an example of a matching room presenting screen.

DETAILED DESCRIPTION OF NON-LIMITING EXAMPLE EMBODIMENTS

A matching system of an example embodiment is a system which includes a server and a plurality of information processing apparatuses connected to the server over a network and which performs matchmaking, in any of a plurality of matching ranges, for a participating user who is attempting to perform predetermined information processing while the information processing apparatuses are communicating information, but in the following, a description will be given, taking as an example embodiment of the matching system, a game system which includes a game server and a plurality of game devices connected to the game server over a network and which performs matchmaking, in any of a plurality of matching rooms, for a participating player who is attempting to play a game while the game devices are communicating information.

FIG. 1 shows an example non-limiting diagram showing an overall configuration of a game system. A game system 100 is configured by a plurality of game devices 300 and a game server 500 being connected in a mutually communicable way over a network NW. Four game devices 300 are connected to the network in FIG. 1, but the number of game devices 300 is not limited to four.

The game device 300 is a portable game device in which an operation button as an input section and a liquid crystal panel as a display section are integrally incorporated. The game device 300 may be connected to an access point by wireless communication such as Wi-Fi, for example, and be connected to the network NW via the access point. Although the game device 300 is a portable game device in the present embodiment, the game device 300 may be a floor-standing game device to be connected to a TV.

With the game system 100, one game can be played at the same time by the game devices 300. At this time, a game program is executed at each of the game devices 300. Each game device 300 transmits operation information of the device to the game server 500 over the network NW. The game server 500 distributes the operation information of each participating player to other participating players. Each game device 300 receives the operation information of another participating player and transfers the information to the game program. The game thereby progresses at each game device 300 based not only on the operation information of the user of the game device 300, but also on the operation information of other participating players. The game in which a plurality of players are participating in is executed in this manner at each game device 300.

As a game where a plurality of players participate in, there are a strategy game where a plurality of participating players play against each other (for example, a car racing game or a quiz game), a collaborative game where a plurality of participating users collaborate to progress in the game (for example, a role-playing game), a team strategy game where a plurality of participating players form teams and the teams play against each other (for example, a sports game), and the like.

Additionally, to execute one game simultaneously at the game devices 300, the game server 500 may perform only matchmaking among a plurality of participating players described later. After groups are formed by the matchmaking and a game is started, the game may progress by the operation information of each game device 300 being exchanged directly among the game devices 300 without using the game server 500, or by the operation information of each game device 300 being exchanged among the game devices 300 via a server different from the game server 500, in which the matchmaking has been performed.

To execute a game as described above where a plurality of players participate in, in the game server 500 a group consisting of a plurality of players who are to play one game together is formed. This group is, for example, a group of participants in a strategy game, a group of participants in a collaborative game, or a group of members of a team in a team strategy game. As such, the game server 500 has a function as a matching device that performs matchmaking among a plurality of players. Players who have been matched are to belong to the same group and play the game.

The game server 500 of an example embodiment performs matchmaking between players particularly in a predetermined matching range. In the present embodiment, this matching range is presented to a user as a matching room. A plurality of matching rooms are provided in the game server 500. Users can form a group in a desired matching room. A matching room is a matching range setting a specific condition, such as a matching room for a certain class in a certain school, a matching room for a certain district, a matching room for fans of a certain celebrity, or the like, and is a matching range explicitly indicating to a user information regarding the specific condition (for example, information such as name, explanation, and the like). For example, in the case where a matching room is provided for a certain class in a certain school, by forming a group there, one can expect that every member of the group is a classmate at the school, i.e., that the group is formed by classmates.

In the following, a configuration of the game system 100 which aids selection of a matching room by a user from a large number of matching rooms will be described. FIG. 2 shows an example non-limiting block diagram showing a configuration of the game device. A configuration of the game device 300 will be described with reference to FIG. 2. In the following, a user who is the owner of this game device 300 will be referred to as a "device user," and a device user who plays a game with another player over a network will be referred to as a "participating player."

The game device 300 includes a transmitting/receiving section 31, a related player storage section 32, a control section 33, a display section 34, and an input section 35. The transmitting/receiving section 31 wirelessly transmits/receives various types of information. In the case of a floor-standing game device, the display section 34 may be replaced by an interface that outputs display signals to an external monitor such as a TV. Additionally, the transmitting/receiving section 31 may include a cable connector and transmit/receive information over a cable (in a wired manner).

The related player storage section 32 stores therein, as information regarding a related player, information regarding a player identified and registered by the device user, a player with established near field communication with the device user, a player who was matched with the device user in the past, a player selected based on an attribute of the device user, or a player matched in a matching room made by the device user.

The control section 33 is configured by an arithmetic processing apparatus executing a predetermined program. The program may be a program read from a computer-readable storage medium or a program stored in the game device 300 itself. The control section 33 executes the program, and thereby configuring, as necessary, a related player presenting section 331, a related player specification receiver 332, a matching room presenting section 333, a matching room specification receiver 334, and a game processor 335.

The display section 34 is a liquid crystal panel, for example, and displays various still images and videos. The input section 35 is a cross-shaped button and a plurality of round buttons. The input section 35 may also be a touch panel that is used together with the display section 34.

The related player presenting section 331 presents to the device user related players of the device user by using the display section 34 to aid selection of a matching room by the device user. The related player presenting section 331 reads related players stored in the related player storage section 32, and outputs the same to the display section 34.

The related player specification receiver 332 receives specification of a related player among the related players presented by the related player presenting section 331. When related players are presented on the display section 34 by the related player presenting section 331, a participating player specifies one of the related players. Specifically, the participating player may place a cursor on a related player to be specified, among the related players displayed on the display section 34, and press an enter button, or may directly specify one related player on a touch panel.

When the specification of a related player is received by the related player specification receiver 332, the transmitting/receiving section 31 transmits the information to the game server 500 and requests for information regarding a matching room that is associated with the related player. The transmitting/receiving section 31 receives from the game server 500 the information regarding the matching room that is associated with the related player whose specification has been received by the related player specification receiver 332. What type of matching room is associated with each player (user) will be described later.

The matching room presenting section 333 presents to the device user by using the display section 34 the information regarding the matching room received by the transmitting/receiving section 31. The matching room specification receiver 334 receives the specification of the matching room presented by the matching room presenting section 333. When the matching room that is associated with the related player is presented on the display section 34 by the matching room presenting section 333, the participating player inputs his/her intention whether or not matchmaking is to be performed in the matching room. The matching room specification receiver 334 receives, as the specification of a matching room, input of the participating player's intention to have matchmaking performed in the presented matching room.

When specification of a matching room is received by the matching room specification receiver 334, the transmitting/receiving section 31 transmits the information to the game server 500 together with the information regarding the participating player, and requests for a matching process.

The game processor 335 follows the program of the game, and inputs an operation of the player (user) on the input section 35 as the operation information, executes the game, and displays the contents of the game by using the display section 34. In the case where the device user plays the game together with other players over the network NW, as descried above, the transmitting/receiving section 31 receives the operation information of other players, and the game processor 335 causes the game to progress based not only on the operation information of the device user from the input section 35, but also on the operation information of other players received by the transmitting/receiving section 31.

FIG. 3 shows an example non-limiting block diagram showing a configuration of a game server that functions as a matching device. A game server (hereinafter, simply referred to as a "matching device") 501 that functions as a matching device includes a transmitting/receiving section 51, a matching room acquisition section 52, a user information database 53, a matching room identification section 54, a matching processor 55, and a game progression section 56. The matching room acquisition section 52, the matching room identification section 54, the matching processor 55, and the game progression section 56 are realized by the game server 500 executing a predetermined program. This program is an example of a matching program that stored in a storage medium of an example embodiment.

The transmitting/receiving section 51 performs communication with the game device 300 over the network NW. One matching room is associated with each user in the user information database 53. A matching room that is associated with each user is a matching room in which the user was most recently matched.

When specification of a related player is received from the game device 300 of the participating player via the transmitting/receiving section 51, the matching room acquisition section 52 refers to the user information database 53 and acquires a matching room that is associated with the related player who has been specified. The matching room acquisition section 52 transmits the information regarding the acquired matching room to the game device 300 of the participating player via the transmitting/receiving section 51, and thereby providing the information regarding the acquired matching room to the game device 300 of the participating player.

When information of the participating player and specification of a matching room are received from the game device 300 of the participating player via the transmitting/receiving section 51, the matching room identification section 54 identifies the matching room which has been specified as a matching room in which the matching processor 55 performs a matching process, and transfers the information regarding the participating player and the information regarding the matching room which has been identified to the matching processor 55.

The matching processor 55 performs matchmaking for the participating player in the matching room which has been identified by the matching room identification section 54. The matching processor 55 performs the matching process using a known technology. The matching processor 55 saves the result of matchmaking in the user information database 53 as the history of matchmaking. The user information database 53 is to hold the information regarding a matching room in which each user was most recently matched, and the like by the history of matchmaking.

When the matching process is completed by the matching processor 55 and a group is formed, the game progression section 56 distributes in the group, via the transmitting/receiving section 51, the operation information of each player to other players, and realizes progression of one game by a plurality of users. Additionally, as described above, to execute one game simultaneously at the game devices 300, the operation information of the game devices 300 may be directly transmitted/received to/from the game devices 300 without using the game server 500.

FIG. 4 shows an example non-limiting block diagram showing a configuration of a game server that functions as a matching room making device. A game server 502 (hereinafter, simply referred to as a "matching room making device 502") that functions as a matching room making device includes the transmitting/receiving section 51, a matching room maker 57, and a matching room database 58.

The transmitting/receiving section 51 has been described as a transmitting/receiving section of the matching device 501, but in a case where the game server 500 functions as the matching room making device 502, the server receives, in particular, various types of information for making a matching room from the game device 300. The matching room maker 57 makes a matching room based on information that the transmitting/receiving section 51 has received from the game device 300. After making a matching room, the matching room maker 57 assigns a unique identification number to the matching room. The matching room made by the matching room maker 57 is saved in the matching room database 58.

According to the present embodiment, a matching room is made by identifying the name of the matching room, a game method adopted in the matching room, and an introductory comment for the matching room. These pieces of information are transmitted from the game device 300 of a device user attempting to make a matching room. The identification number, the name, the game method, and the introductory comment are stored in the matching room database 58 for each matching room.

Next, a player matching method performed in the game system 100 configured as above will be described. FIG. 5 shows an example non-limiting flowchart of the matching method. FIGS. 6 to 9 show example non-limiting diagrams showing example displays on the display section 34 of the game device 300 at the time of performing the matching method. In the following, the matching method will be described according to the flowchart of FIG. 5 while referring to the example displays of the display section 34 of the game device 300 shown in FIGS. 6 to 9.

First, a matching top screen shown in FIG. 6 is displayed by a predetermined operation of a device user on the game device 300. When the device user selects "search for matching room", shift to a matching room search top screen shown in FIG. 7 takes place. If the device user selects "make matching room" on the matching top screen of FIG. 6, the game server 500 will function as the matching room making device 502, and a matching room making process will be started.

When the device user selects "search among related players" on the matching room search top screen of FIG. 7, the matching method according to the present embodiment shown by the flowchart of FIG. 5 is started. Additionally, when "random search," "favorites," "recommendations," or "search by number" is selected, selection of a matching room by the device user can be aided, but the explanation is omitted.

First, the related player presenting section 331 of the game device 300 reads, and outputs to the display section 34, related players stored in the related player storage section 32, and thereby presenting, to the device user of the game device 300 who is a participating player, the related players for the device user (step S501). FIG. 8 shows an example non-limiting diagram showing an example of a related player presenting screen on the display section 34.

When the participating player operates the input section 35 and specifies any of the related players, the related player specification receiver 332 receives this specification (step S502), and the transmitting/receiving section 31 transmits the specification to the matching device 501. At the matching device 501, the matching room acquisition section 52 receives the specification of the related player via the transmitting/receiving section 51. The matching room acquisition section 52 refers to the user information database 53 and acquires a matching room that is associated with the related player who has been specified (step S503).

The matching room acquisition section 52 transmits the information regarding the matching room acquired to the game device 300 of the participating player via the transmitting/receiving section 51. The game device 300 receives the information by the transmitting/receiving section 31, and the matching room presenting section 333 presents to the participating player, using the display section 34, the information regarding the matching room received by the transmitting/receiving section 31 (step S504). FIG. 9 shows an example non-limiting diagram showing an example of a matching room presenting screen on the display section 34. In this example, a matching room named "KYOTO" is presented.

When the matching room is presented on the display section 34 by the matching room presenting section 333, the participating player inputs his/her intention whether or not matchmaking is to be performed in the matching room (step S505). If the participating player selects "OK" on the matching room presenting screen of FIG. 9, his/her intention to have matchmaking performed in the matching room presented is input via the input section 35, and the matching room specification receiver 334 receives this input as specification of a matching room (YES in step S505).

Additionally, if the participating player selects "cancel" on the matching room presenting screen of FIG. 9 and the matching room specification receiver 334 receives input of the participating player's intention to not have matchmaking performed in the presented matching room (NO in step S505), the process returns to step S501 so as to make the participating player select again a related player.

When the input intention of the participating player to have matchmaking performed in the presented matching room is received (YES in step S505), the matching room specification receiver 334 transmits the information regarding the participating player and the specification of the matching room to the matching device 501 via the transmitting/receiving section 31, and requests the matching device 501 to perform a matching process.

When the information regarding the participating player and the specification of the matching room are received via the transmitting/receiving section 51, the matching room identification section 54 identifies the matching room which has been specified as the matching room in which the matching processor 55 performs a matching process, and transfers the information regarding the participating player and information of the matching room identified to the matching processor 55 (step S506). Then, the matching processor 55 performs matchmaking for the participating player in the matching room which has been identified by the matching room identification section 54 (step S507). Additionally, if there is a group which the player can join in the matching room, the matching processor 55 performs a process for making the participating player join the group, and if there is no group with a room enough to add a new participating player in the matching room, the matching processor 55 performs a process to make a new group with other participating players.

When the matching process is completed by the matching processor 55 and a group is formed, the game progression section 56 starts to progress of the game with the players of the group (step S508). When the game is over, the game progression section 56 asks each player of the group whether to continue with the game or to withdraw from the group (quit the game) (step S509). If the player selects to progress of the game (NO in step S509), the process returns to step S508 to progress with the game, and if the player selects to withdraw from the group (YES in step S509), the process is ended. In the case where one or some of the players of the group withdraw from the group, new player(s) will join the group by the matching process.

As described above, according to the game system 100 of the present embodiment, to a participating player, related players related to the participating player, the related players including but not limited to a player identified and registered by the participating player, a player with established near field communication with the participating player, a player who was matched with the participating player in the past, a player selected based on an attribute of the participating player, and/or a player matched in a matching room made by the participating player are presented by the game device 300, and when the participating player selects a desired related player, a matching room in which the related player was most recently matched is presented, thus allowing the participating player to form a group in a matching room in which a player related to the participating player most recently joined and to play a game. Therefore, even if a large number of matching rooms exist, the participating player can be aided to select a matching room among the matching rooms.

Additionally, in the embodiment described above, a matching room in which each user (player) was most recently matched is associated with each user in the user information database 53, but a matching room to be associated with each user is not limited to the above. A matching room may be associated with each user, in the user information database 53, in which the user is most frequently matched, in which the user is currently matched, or which is made by the user.

Furthermore, in the embodiment and modifications described above, only one matching room is associated with each user in the user information database 53, and when specification of a related player is received from the game device 300 of a participating player, the matching room acquisition section 52 acquires the one matching room associated with the related player and provides information regarding the matching room to the game device 300 of the participating player, and the matching room presenting section 333 asks whether or not to perform matchmaking in the matching room, but the method of presenting a matching room is not limited to the above.

A plurality of matching rooms may be associated with each user in the user information database 53, and the matching room acquisition section 52 may present, to the game device 300 of a participating player, a plurality of matching rooms associated with a related player of the participating player. In this case, besides the matching room in which the user is most recently matched, matching rooms associated with each user may include but not be limited to a matching room in which the user is most frequently matched based on the history of matchmaking of the user, a matching room in which the user is currently matched, and/or a matching room made by the user.

In the embodiment described above, the matching device 501 includes the user information database 53 which saves information regarding a matching room in which each user was most recently matched and the like, and the matching room acquisition section 52 refers to the user information database 53 and acquires a matching room associated with a related player who has been specified, but information regarding a matching room associated with each user may be saved in the game device 300 of the user. That is, information regarding a matching room associated with his/her game device 300 may be saved in the game device 300.

In this case, the matching room acquisition section 52 acquires information regarding a matching room associated with a related player who has been specified by the game device 300 of a participating player from the game device 300 of the related player.

Furthermore, as described above, a user identified and registered by a participating player, a user with established near field communication with the participating player, a user who was matched with the participating player in the past, a user selected based on an attribute of the participating player, and/or a user matched in a matching room made by the participating player may be the related player. Information regarding a matching room that is associated with the user who has become the related player may be linked to the related player and be saved in the game device 300 of the participating player when another user was identified and registered as a related player, or near field communication was established with another user, or another user was matched with the participating player, or another user was selected as a related player based on an attribute of the participating player, or another player was matched in a matching room made by the participating player.

In this case, it becomes unnecessary for the game device 300 to make an inquiry to the matching device 501 in order to acquire information regarding a matching room that is associated with a related player, as in the embodiment described above, and the matching room presenting section 333 of the game device 300 can present a matching room linked to the related player that is saved in the game device 300.

Furthermore, in the embodiment and modifications described above, a participating player specifies a matching room in which matchmaking is to be performed, after the participating player has specified a related player and one or more matching rooms associated with the related player have been presented, but presentation and specification of a matching room may be omitted.

In this case, when the participating player specifies a related player, information regarding the participating player and information regarding the related player who has been specified are transmitted from the game device 300 to the game server 500. When specification of the related player is received, the matching room acquisition section 52 of the game server 500 refers to the user information database 53, acquires a matching room that is associated with the related player, and provides information regarding the matching room to the matching room identification section 54 together with the information regarding the participating player. The matching room identification section 54 identifies the matching room provided by the matching room acquisition section 52 as a matching room in which matchmaking is to be performed by the matching processor 55.

Generally, a plurality of groups are formed in one matching room and a game is played in each group, and matchmaking for a participating player is performed with any other participating players in the matching room, but if, in the modifications described above, a matching room in which a related player is currently matched is specified by a participating player, it is desirable that the participating player be matched particularly with the related player. This allows a participating player to play a game in the same group as the related player as long as the related player has formed a group in a matching room and is playing a game and the group has a room for a new participating player, or as long as the related player, as a participating player, is waiting to be matched in a matching room.

Furthermore, in the embodiment described above, at the time of presenting a related player, information whether or not the related player is online and can be matched may be displayed. Alternatively, it is possible to present only the related play who is online and who can be matched, among the related players stored in the related player storage section 32. In these cases, information regarding a status whether or not each user is online and can be matched may be held in the user information database 53 of the matching device 501, and the game device 300 may refer to the user information database 53 of the matching device 501 at the time of presentation of related players at the game device 300 and acquire information regarding the status of the related players.

Also, in the embodiment described above, an explanation is given taking as an example a game device that executes, as predetermined information processing that is performed while performing information communication among a plurality of information processing apparatuses, one game together with the information processing apparatuses while transmitting/receiving operation information thereamong. However, the information processing that is performed while information communication is being performed by a plurality of information processing apparatuses is not limited to a game. For example, the information processing that is performed in the above manner may be transmission/reception of text data (a chat) among a plurality of information processing apparatuses.

Furthermore, in the embodiment described above, an example is described where a matching room explicitly indicating a specific condition by the name or the like is presented to a user as the matching range, but the matching range is not limited to such. For example, the matching range may be identified, in the example of the game system described above, by a combination of conditions including but not limited to a game method, an attribute of a participating player (including but not limited to sex, age and/or nationality), and/or the level of the participating player, and the range identified in this manner do not have to be explicitly indicated to a user.

While the non-limiting example embodiments have been described in detail, the foregoing description is in all aspects illustrative and not restrictive. It will be understood that numerous other modifications and variations can be devised without departing from the scope of the invention.

What is claimed is:

1. A matching system including a server and first and second information processing apparatuses each configured to connect to the server over a network, and perform information processing while the first and second information processing apparatuses are communicating information over the network, a first user using the first information processing apparatus is associated with a first matching range, a second user using the second information processing apparatus is associated with a second matching range, the second matching range being different from the first matching range, the first information processing apparatus comprising:
    an input device configured to receive user input;
    a network interface configured to communicate over the network with the server and other information processing apparatuses; and
    at least one processor operatively coupled to the input device and the network interface, the at least one processor configured to:
        receive, via the input device, selection of the second user as a related user;
        in response to the received selection, identify, from among a plurality of matching ranges, the second matching range associated with the selected second user; and
    the matching system being further configured to use the identified second matching range to match the first user with at least a third user using a third information processing apparatus for joining an online multiplayer game in which the third player is attempting to play and during which the first information processing apparatus communicates with the third information processing apparatus using the network interface, wherein the second matching range associated with the related user is any of a matching range in which the related user has most recently been matched, a matching range determined based on a history of matchmaking of the related user, a matching range in which the related user is currently matched, and a matching range made by the related user.

2. The matching system according to claim 1, wherein the related user includes at least any of a user identified and registered by the first user, a user with established near field communication with the first user, a user who has been matched with the first user in past, a user selected based on an attribute of the first user, and a user matched in the first matching range of the first user.

3. The matching system according to claim 1, wherein the at least one processor is further configured to:
    present, on a display, the identified second matching range that is associated with the related user; and
    receive, via the input device, selection of the presented second matching range,
    wherein the selected matching range is a matching range to match the first user with at least the third user for joining the online multiplayer game.

4. The matching system according to claim 1, wherein the at least one processor presents, on a display, the related user so as to show that the related user is online.

5. The matching system according to claim 1, wherein the matching system is configured to perform matchmaking between the first user and the related user.

6. The matching system according to claim 1, wherein the at least one processor is further configured to:
    determine a matching range to match the first user with users of other information processing apparatuses based on an operation made by the first user using the input device at the first information processing apparatus.

7. The matching system according to claim 1, wherein the matching system is configured to perform matchmaking in the identified matching range, without presenting a user who is matched within the identified matching range.

8. The matching system according to claim 1,
    wherein the server is a game server,
    wherein the first information processing apparatus is a game device, and
    wherein the matching system is a game system which includes the game server and a plurality of game devices connected to the game server over a network and which performs matchmaking, in any of the plurality of matching ranges, for the first user attempting to play the online multiplayer game while the game devices are communicating information.

9. The matching system according to claim 1, wherein the identified matching range is a matching room explicitly indicating a specific condition regarding users who are allowed to join the matching room.

10. An information processing apparatus used in the matching system according to claim 1, comprising:
    a memory storing therein information regarding the second user; and
    the at least one processor is further configured to present the related user based on the information stored in the user memory.

11. A server used in the matching system according to claim 1, comprising:
    at least one server processor configured to acquire the second matching range that is associated with the related user and to provide information regarding the acquired matching range to the first information processing apparatus in response to a request, from the first information processing apparatus, for a matching range associated with the related user; and
    wherein the at least one server processor is further configured to receive, from the first information processing apparatus, the identified second matching range, and to use the identified second matching range to match the first user with at least the third user for joining the online multiplayer game.

12. A server used in the matching system according to claim 1, comprising:
    at least one server processor configured to acquire a matching range that is associated with the related user, transmit the acquired matching range to the first information processing apparatus, and match the first user with at least the third user for joining the online multiplayer game based on the identified second matching range.

13. The matching system according to claim 1, wherein the second matching range associated with the selected second user is received from the server and the second matching range includes one or more conditions satisfied by the selected second user.

14. The matching system according to claim 1, wherein the first user and the third user participate simultaneously in the multiplayer game.

15. The matching system according to claim 1, wherein the first user is matched with the third user which satisfies a plurality of conditions included in the identified second matching range.

16. The matching system according to claim 1, wherein the matching system is configured to use the identified second matching range to match the first user with a plurality of other users who satisfy, at the time matching is performed, a conditioned of the second matching range, and wherein the condition of the second matching range is not satisfied by the first user at the time matching is performed.

17. The matching system according to claim 1, wherein the matching system is configured to use the identified second matching range to match the first user with a group of other users which does not include the second user, and each user in the group of other users satisfying a conditioned of the second matching range.

18. A matching method for performing matchmaking for a first information processing apparatus including a processor configured to perform information processing while communicating information, using a network interface operatively coupled to the first information processing apparatus, with other information processing apparatuses over a network, a first user using the first information processing apparatus is associated with a first matching range, the matching method comprising:
receiving, via an input device operatively coupled to the first information processing apparatus, selection of a second user using a second information processing apparatus as a related user;
in response to the received selection, identifying, from among a plurality of matching ranges, a second matching range associated with the selected second user, the second matching range being different from the first matching range; and
using the identified second matching range to match the first user with at least a third user using a third information processing apparatus for joining an online multiplayer game in which the third player is attempting to play and during which the first information processing apparatus communicates with the third information processing apparatus using the network interface, wherein the second matching range associated with the related user is any of a matching range in which the related user has most recently been matched, a matching range determined based on a history of matchmaking of the related user, a matching range in which the related user is currently matched, and a matching range made by the related user.

19. A non-transitory storage medium having stored therein a matching program causing a computer of a first information processing apparatus to perform matchmaking with one or more other information processing apparatuses communicating with the first information processing apparatus over a network using a network interface operatively coupled to the first information processing apparatus, a first user using the first information processing apparatus is associated with a first matching range, and a second user using a second information processing apparatus is associated with a second matching range, the second matching range being different from the first matching range, the matching program upon execution by the computer causes the computer to perform:
receiving, via an input device operatively coupled to the first information processing apparatus, selection of the second user as a related user;
in response to the received selection, identifying, from among a plurality of matching ranges, the second matching range associated with the selected second user;
using the identified second matching range to match the first user with at least a third user using a third information processing apparatus for joining an online multiplayer game in which the third player is attempting to play and during which the first information processing apparatus communicates with the third information processing apparatus using the network interface; and
after matching the first user with at least the third user, performing information processing while communicating information with the third information processing apparatus over the network using the network interface, wherein the second matching range associated with the related user is any of a matching range in which the related user has most recently been matched, a matching range determined based on a history of matchmaking of the related user, a matching range in which the related user is currently matched, and a matching range made by the related user.

20. A non-transitory storage medium having stored therein a matching program causing a computer of a first information processing apparatus for performing matchmaking for a first user attempting to perform information communication with a plurality of information processing apparatuses over a network, a first user using the first information processing apparatus performing information communication with one or more of the plurality of information processing apparatuses using a network interface operatively coupled to the first information processing apparatus, the matching program upon execution by the computer causes the computer perform:
displaying, on a display operatively coupled to the first information processing apparatus, representations of a plurality of users associated with respective information processing apparatuses, wherein the users of the plurality of information processing apparatuses are related to the first user associated with a first matching range and each user associated with at least one matching range from among a plurality of matching ranges;
receiving, via an input device operatively coupled to the first information processing apparatus, selection of a second user thereof from the displayed representation of the plurality of users, the second user is associated with a second matching range, the second matching range being different from the first matching range;
in response to the received selection, identifying, from among a plurality of matching ranges, the second matching range associated with the selected second user; and
performing matchmaking to match the first user using the identified matching range with at least a third user using a third information processing apparatus for joining an online multiplayer game in which the third player is attempting to play and, wherein the second matching range associated with the second user is any of a matching range in which the second user has most recently been matched, a matching range determined based on a history of matchmaking of the second user, a matching range in which the second user is currently matched, and a matching range made by the second user.

* * * * *